2,872,462
ISOTHIOCYANO-STEROIDS AND METHODS OF PREPARING SAME

Wolfgang Loechel, Berlin-Spandau, and Martin Schenck, Berlin-Frohnau, Germany, assignors to Schering A. G., Berlin, Germany, a corporation of Germany No Drawing. Application June 17, 1958
Serial No. 742,498

Claims priority, application Germany July 15, 1957

19 Claims. (Cl. 260—397.3)

This invention relates to isothiocyano-steroids and to methods for their preparation. More particularly, the invention concerns a novel method for the preparation of novel isothiocyano derivatives of the androstane, and pregnane series.

As known there are extensive parallels between the halogenation and the thiocyanization of organic compounds. In principle, methods which are wholly analogous to those used for the introduction of halogen, may also be used for the introduction of thiocyano residues into organic compounds. Thus, corresponding to direct halogenation with free halogen, there can be carried out a direct thiocyanization with free thiocyanogen (rhodan), $N\equiv C$—S.S—$C\equiv N$; with substitution of a hydrogen atom attached to carbon by the thiocyano group $S.C\equiv N$. Furthermore, it is also possible, in analogy to the addition of hydrogen halide to a carbon-carbon double bond, also to add to the latter thiocyanic acid. In contrast to the introduction of halogen, the introduction of a thiocyano group offers certain difficulties which arise because of the existence of the thiocyano group in isomeric forms, e. g. tautomeric thiocyanic-isothiocyanic acid, $N\equiv C$—SH$\rightleftharpoons$NH=C=S. It cannot therefore be predicted with certainty whether the chosen reaction will in individual cases lead to the formation of a thiocyano compound R—S—$C\equiv N$, or to the corresponding isothiocyano compound R—N=C=S. Frequently both types of compounds are formed at the same time, so that in most cases it cannot be said with certainty whether the isothiocyano compound is primarily formed, or whether it is the result of a subsequent transformation. There are known the comparatively readily produced transformations of allyl thiocyanate into allyl isothiocyanate (mustard oil), which are linked with the shifting of a carbon-to-carbon double bond.

In this state of the art it was wholly unpredictable that, given the problem of preparing isothiocyano compounds of the steroid series, such a result could be obtained by using known methods for the introducing of the thiocyano group into compounds of the steroids.

In the steroid series there has been known until the present time only one individual isothiocyano compound, namely, 7-cholesteryl-isothiocyanate (cf. British Patent 714,624, 1954), in which it was obtained as a secondary by-product along with the normal thiocyano compound by the direct thiocyanization of cholesterin with free thiocyanic acid). Since the corresponding free isothiocyanic acid is as yet not known, direct isothiocyanization as a method of preparing isothiocyano-steroids does not come into consideration. Moreover, the addition of the tautomeric thiocyanic acid to an unsaturated steroid did not seem very promising for the preparation of isothiocyano-steroids to begin with, because the action of thiocyanic acid upon olefins generally takes place under vigorous conditions whereby predominantly isothiocyano compounds are formed, and this would hardly appear possible for use in connection with the much more sensitive steroid compounds (cf. Klason, J. prakt. Chem. (2), vol. 35, page 407 (1887); Kharasch, J. A. C. S., vol. 59, page 1580 (1937); Naylor, J. Chem. Soc. (London) 1945, p. 247; U. S. Patents 2,411,869 (1946) and 2,689,255 (1952); British Rubber Producers Research Assn., Rubber Chem. Techn., vol. 19, pp. 34-35 (1946); Luskin, J. Org. Chem., vol. 21, page 1430 (1956)).

In the addition of thiocyanic acid to simple aliphatic and alicyclic $\alpha,\beta$-unsaturated ketones, such as mesityl oxide and substituted cyclohexenone, which more closely resemble the most interesting steroids, particularly the steroid hormones, it would be expected, according to data in the literature, that normal thiocyano compounds would be obtained (cf. U. S. Patent 2,395,453, and Luskin, J. A. C. S., vol. 78, page 4965 (1956)).

It was found, however, in accordance with the present invention, surprisingly and unexpectedly, that upon treating $\alpha,\beta$-unsaturated steroid ketones with thiocyanic acid, under relatively mild conditions to be explained more fully below, the thiocyanic acid in its tautomeric form is added to the carbon-carbon double bond standing in conjugation to the keto group, whereby the isothiocyano group occurs in the $\beta$-position to the keto group. Even more remarkable is the fact that any isolated carbon-carbon double bond that may be present additionally in the steroid molecule remains unaffected.

The present invention therefore involves the preparation of isothiocyano-steroids by means of the action of concentrated aqueous solutions of thiocyanic acid under mild conditions upon $\alpha,\beta$-unsaturated steroid ketones, thereby obtaining isothiocyano-steroids in which the isothiocyano group occupies the $\beta$-position to a keto group.

The steroid ketones which may be used as starting materials for the process and products of this invention may have in addition to or in place of the aforementioned isolated double bonds a wide variety of other substituents, such as isolated keto groups and/or hydroxyl groups, and further may also contain side-chains, for example, at the 17-carbon atom.

Although the method of the present invention is generally applicable to the action of thiocyanic acid upon $\alpha,\beta$-unsaturated steroid ketones, it is especially valuable when applied to such ketosteroid starting products as $\Delta^4$-3-keto-, $\Delta^1$-3-keto-, $\Delta^{9(11)}$-12-keto-, and $\Delta^{16}$-20-keto-steroids. Examples of these keto-steroids include testosterone of testerone acetate, methyltestosterone, $\Delta^4$-androstene-11$\beta$-ol-3,17-dione, $\Delta^{16}$-dehydropregnenolone acetate, $\Delta^{16}$-dehydroprogesterone, 17$\alpha$-hydroxy-progesterone caproate, $\Delta^1$-androstene-17$\beta$-ol-3-one, 19-nor-17$\alpha$-methyltestosterone, 17$\alpha$-ethinyl-19-nortestosterone and its acetate, and its oenanthate, progesterone, 11-hydroxyprogesterone, Reichstein-S-acetate, hydrocortisone acetate, 3-keto-$\Delta^4$-bisnor-cholenic acid methyl ester, $\Delta^{9(11)}$-dehydrohecogenin-acetate, $\Delta^{16}$-dehydropregnenolone, and the like.

If there are present in the molecule of the starting material several $\alpha,\beta$-unsaturated keto groups, the addition of the thiocyanic acid can occur either partially only at one of the CO-conjugated carbon-carbon double bonds, or it can take place at all of them.

The isothiocyano-steroids obtainable in accordance with the present invention, particularly those which have the isothiocyano group in the postions 1, 5, 9, and 16, are interesting pharmacologically, and may be used as drugs and therapeutic agents, or as intermediates for the preparation of such agents.

Thus, they may serve as intermediate products, for example, for the introduction of amino or hydroxy groups (or of their functional derivatives) into the steroid positions in question.

The conversion of the $\alpha,\beta$-steroid ketones with thiocyanic acid takes place in accordance with the novel process of the present invention, under mild conditions suited to the sensitivity of the starting materials. Advantageously the operation is conducted in a two-phase system in which the steroid ketone is dissolved in an inert organic solvent which is immiscible with water, preferably a halogenated hydrocarbon such as methylene chloride, while the thiocyanic acid with which the steroid ketone is to be treated is in the form of a concentrated aqueous solution, about 25% strength by weight. Both phases are brought into intimate contact through energetic stirring or shaking for several hours. The conversion takes place even at room temperature. It is desirable to exclude oxygen and light.

On account of the long reaction time, the thiocyanic acid, which is fairly unstable in concentrated aqueous solution, must be used in great excess. It has therefore proved to be advantageous not to prepare all the thiocyanic acid to be used in advance in a single batch, but rather to replenish the aqueous phase one or more times during the course of the reaction with freshly prepared quantities of concentrated aqueous thiocyanic acid.

The following general operating principles are observed in carrying out the procedures described in the accompanying examples:

1.0 g. of α,β-unsaturated keto-steroid is dissolved in 50 ml. of methylene chloride, and shaken (with exclusion of light) and under nitrogen, at room temperature with 40 ml. of an approximately 25% aqueous thiocyanic acid solution, for 18 hours. The excess thiocyanic acid is neutralized with solid sodium bicarbonate to a weakly acid reaction, and the mixture freed from miscellaneous polymerization products by suction filtration. The organic phase is separated and the aqueous phase is then after-extracted twice with methylene chloride. The combined methylene chloride extracts are washed until neutral and thiocyanate-free with sodium bicarbonate and water, dried over sodium sulfate and concentrated in vacuo.

The isothiocyano-steroids remain generally as a yellowish oil, which can conveniently be made to crystallize rapidly by rubbing with methanol, ether, or acetone-hexane.

The following examples serve to illustrate the present invention, but it is not to be regarded as limited thereto.

EXAMPLE 1

*5-isothiocyano-androstane (or -testane)-17β-ol-3-one acetate*

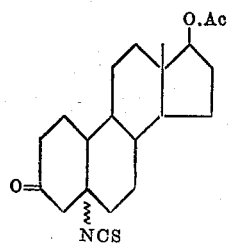

11.5 g. of testosterone acetate are treated with thiocyanic acid in accordance with the general description given above. After 18 hours the thiocyanic acid is replaced with a freshly prepared thiocyanic acid solution, and the shaking continued for another 18 hours. After working up as above described, there is obtained 13.1 g. of an oily, pale yellow crude product from which upon rubbing with ether-hexane there can be isolated 9.9 g. of a crystalline compound of m. pt. 127–132° C. After several quick recrystallizations from methanol there are obtained 2.7 g. of leaflets of the pure stable 5-isothiocyano compound, m. pt. 137.5–140° C. (decomp.).

Analysis—$C_{22}H_{31}O_3NS$:
 Calculated—
  C=67.80%
  H=8.03%
  N=3.61%
  S=8.25%
 Found—
  C=67.7%
  H=8.1%
  N=3.6%
  S=8.1%

$[\alpha]_D^{27} = +43°$ (methylene chloride, c.=1.03)

JR:
 $\lambda_{max}^{KBr} = 4.82\mu$ (—NCS) wide, very strong, conical bands/5.79 (acetate)/5.83 (3-keto)—Schulter/8.03 (acetate)/

UV:
 $\epsilon_{248}^{MeOH} = 1540$ (characteristic for —N=C=S)
 $\epsilon_{206}^{MeOH} = 3640$ No indications are present of unconverted Δ⁴-3-ketone in the UV- or JR-spectrum.

EXAMPLE 2

*5-isothiocyano-17α-methyl-androstane-(or -testane)-17β-ol-3-one*

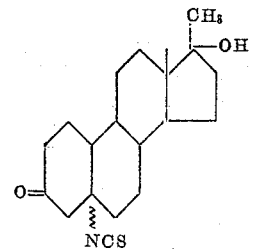

10.0 g. of methyltestosterone are treated with thiocyanic acid as described under the general procedure above; after 18 hours the aqueous acid is separated and replaced with freshly prepared thiocyanic acid solution. The reaction time is extended another 18 hours to a total of 36 hours. After working up as usual, there are obtained 11.0 g. of a yellowish, frothy product which crystallizes to 9.1 g. of crystals upon rubbing with ether-acetone-hexane; m. pt. 131–138° C. After recrystallizing from ethyl acetate-hexane and twice from acetone-hexane there are obtained 2.7 g. of the pure isothiocyano compound, m. pt. 145–148° C. (decomp.).

Analysis—$C_{21}H_{31}O_2NS$:
 Calculated—
  C=69.80%
  H=8.64%
  N=3.86%
  S=8.87%
 Found—
  C=70.2%
  H=8.9%
  N=4.0%
  S=8.8%

$[\alpha]_D^{27} = +12°$ (methylene chloride, c.=1.03

JR:
 $\lambda_{max}^{KBr} = 2.93$ (OH)/4.67–4.71 (—NCS) wide, very strong conical bands/5.83 (3-keto)/

UV:
 $\epsilon_{249}^{MeOH} = 2140$ (characteristic for —N=C=S)
 $\epsilon_{207}^{MeOH} = 3030$ Neither in the UV- or JR-spectrum are indications present of unconverted Δ⁴-3-ketone.

EXAMPLE 3

*5-isothiocyano-androstane-(or -testane)-11β-ol-3,17-dione*

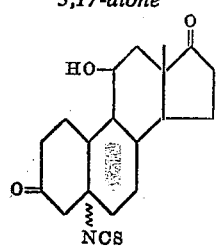

From 4.3 g. of Δ⁴-androstene-11β-ol-3,17-dione there are obtained by the general method of procedure 6.0 g. of crude product; by triple recrystallization from ethyl acetate-hexane, there are obtained 0.9 g. of pure 5-iso-thiocyano-androstane-(or testane)-11β-ol-3,17-dione, in the form of colorless needles, as $K_1$, m. pt. 150–151° C.

Analysis—$C_{20}H_{27}O_3NS$:
　Calculated—
　　C=66.43%
　　H=7.53%
　　N=3.88%
　　S=8.87%
　Found—
　　C=66.6%
　　H=7.4%
　　N=3.7%
　　S=8.6%

$[\alpha]_D^{27} = +144$ (methylene chloride, c.=1.025)

JR:
　$\lambda_{Max}^{KBr} = 2.92$ (OH)/4.77 (—NCS) wide, very strong, conical bands/5.79–5.83 (3- and 17-keto)

UV:
　$\epsilon_{246}^{MeOH} = 2024$ (characteristic for —N=C=S)
　$\epsilon_{207}^{MeOH} = 2650$ Neither in the UV- or JR-spectrum are indications present of unconverted Δ⁴-3-ketone.

EXAMPLE 4

*16β-isothiocyano-Δ⁵-pregnene-3β-ol-20-one acetate*

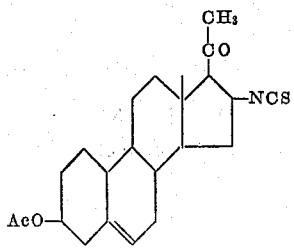

From 8.3 g. of Δ¹⁶-dehydropregnenolone acetate there are obtained by the above general procedure 9.5 g. of crude product which, rubbed with methanol, yields 7.8 g. of a crystalline product of m. pt. 112–117° C. The isothiocyano compound is pure after two recrystallizations from methanol, and comprises 6.9 g. of m. pt. 118–120° C.

Analysis—$C_{24}H_{33}O_3NS$:
　Calculated—
　　C=69.36%
　　H=8.00%
　　N=3.37%
　　S=7.71%
　Found—
　　C=69.1%
　　H=8.1%
　　N=3.4%
　　S=7.6%

$[\alpha]_D^{27} = -23°$ (methylene chloride, c.=1.03)

JR:
　$\lambda_{max}^{KBr} = 4.62$ Schulter; 4.76 (—NCS) wide, very strong, conical bands/5.78 (acetate)/5.86 (20-keto)/807 (acetate)/9.68 (acetate)/

UV:
　$\epsilon_{247}^{MeOH} = 1250$ (characteristic for —N=C=S)
　$\epsilon_{208}^{MeOH} = 2520$
　$\epsilon_{285}^{MeOH} = 130.5$ Neither in the UV- or the JR-spectrum are indications present of unconverted Δ¹⁶-20-ketone.

EXAMPLE 5

*5,16β-di-isothiocyano-pregnane-(or allopregnane)-3,20-dione*

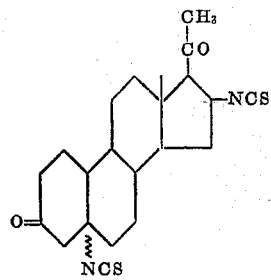

5.0 g. of Δ¹⁶-dehydroprogesterone were treated with thiocyanic acid according to the general procedure; the addition to the Δ¹⁶ double bond is completed after about 3 hours. In order to complete the addition to the Δ⁴ double bond the thiocyanic acid solution is replaced after 18 hours by fresh, 25% thiocyanic acid and the reaction extended to a total of 36 hours. The frothy amorphous residue (6.3 g.) is treated with boiling methanol. The solution is decanted while still hot from precipitated white residue, the latter is washed twice more with a little hot methanol and decanted, to obtain 1.2 g., m. pt. 166–169° C. After recrystallizing from methanol there are obtained 0.95 g. of the pure di-isothiocyano compound, m. pt. 186–186.5° C.

Analysis—$C_{23}H_{30}O_2N_2S_2$:
　Calculated—
　　C=64.16%
　　H=7.03%
　　N=6.51%
　　S=14.89%
　Found—
　　C=64.1%
　　H=7.2%
　　N=6.9%
　　S=14.7%

$[\alpha]_D^{28} = +17°$ (methylene chloride, c.=1.01)

JR:
　$\lambda_{max}^{KBr} = 4.75$ (—NCS) wide, very strong, conical bands/5.84–5.87 (3- and 20-keto)

UV:
　$\epsilon_{248}^{MeOH} = 2800$ (characteristic for —N=C=S)
　$\epsilon_{205}^{MeOH} = 5940$ Neither in the UV- or JR-spectrum could there be detected the presence of unconverted Δ⁴-3-ketone or Δ¹⁶-20-ketone.

EXAMPLE 6

*5-isothiocyano-pregnane-(or allopregnane)-17α-ol-3,20-dione-17-caproate*

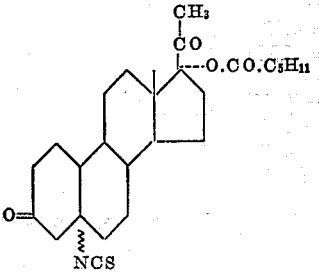

10 g. of 17α-hydroxyprogesterone caproate are treated with 25% thiocyanic acid in accordance with the above described procedure; after 20 hours, the acid is renewed and the mixture shaken for another 20 hours. (As thiocyanic acid there is employed either a distilled acid or a mixture of alkali thiocyanate solution and dilute sulfuric acid of equivalent concentration.)

Upon working up as previously described, an oily residue is recovered from which on rubbing with absolute ether is obtained 4.0 g. of crude product; from the mother liquor, unconverted starting material may be recovered. The crystalline crude product is recrystallized twice from methanol and once from isopropyl ether. There are obtained 2.1 g. of pure 5-isothiocyano-steroid of m. pt., 58–159.5° C. (decomp.).

Analysis—$C_{28}H_{41}O_4NS$:
　　Calculated—
　　　　C=68.96%
　　　　H=8.47%
　　　　N=2.87%
　　　　S=6.57%
　　Found—
　　　　C=69.0%
　　　　H=8.6%
　　　　N=3.0%
　　　　S=6.8%

$[\alpha]_D^{22} = +56°$ (methylene chloride, c.=1.09)

IR:
　　$\lambda_{max}^{KBr} = 4.83$ (—NCS) wide, very strong, conical bands/ 5.82–5.87 (3-, 20-ester-CO)/8.53 C—O-caproate/

UV:
　　$\epsilon_{249}^{MeOH} = 1530$
　　$\epsilon_{206}^{MeOH} = 2950$

Neither in the UV- or IR-spectrum could the presence of unconverted $\Delta^4$-3-ketone be detected.

EXAMPLE 7

*1-ξ-isothiocyano-androctane-17β-ol-3-one*

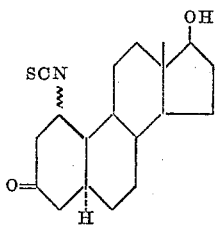

1.2 g. of androst-1-ene-17β-ol-3-one are dissolved in 60 ml. of methylene chloride and treated with 50 ml. of an 8% aqueous thiocyanic acid solution in excess dilute sulfuric acid in accordance with the general procedure above, for 18 hours. The amorphous crude transformation product is recrystallized from isopropyl ether-acetone; yield is 1.0 g. of m. pt. 125–126° C. (decomp.).

Analysis—$C_{20}H_{29}O_2NS$:
　　Calculated—
　　　　C=69.13%
　　　　H=8.41%
　　　　N=4.03%
　　　　S=9.23%
　　Found—
　　　　C=69.5%
　　　　H=8.6%
　　　　N=4.1%
　　　　S=9.2%

$[\alpha]_D^{21} = +103°$ (methylene chloride, c.=1.00)

IR:
　　$\lambda_{max}^{KBr} = 2.93$ (OH)/4.82 (—NCS) wide, very strong, conical bands/5.83 (3-ketone)/

UV:
　　$\epsilon_{247}^{MeOH} = 1190$
　　$\epsilon_{207}^{MeOH} = 2340$

Neither in the UV- or the IR-spectrum could the presence of unconverted $\Delta^1$-3-ketone be detected.

EXAMPLE 8

*5-isothiocyano-19-nor-17-α-methyl-androstane-(or testane)-17β-ol-3-one*

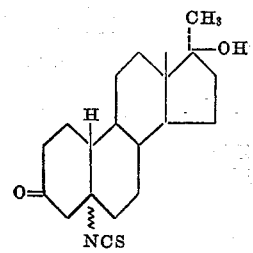

8 g. of 19-nor-17α-methyltestosterone were dissolved in 400 ml. of methylene chloride and treated with 320 ml. of an 8% aqueous thiocyanic acid solution in excess dilute sulfuric acid in accordance with the general procedure. The addition of thiocyanic acid at the $\Delta^4$ double bond is practically ended after 2 hours. Crude product is 10.3 g. From this through crystallization from acetone-hexane there are obtained 6.6 g. of pure 5-isothiocyano-19-nor compound of m. pt. 120.5–122.5° C. (decomp.).

Analysis—$C_{20}H_{29}O_2NS$:
　　Calculated—
　　　　C=69.13%
　　　　H=8.41%
　　　　N=4.03%
　　　　S=9.23%
　　Found—
　　　　C=69.2%
　　　　H=8.7%
　　　　N=4.1%
　　　　S=9.2%

$[\alpha]_D^{22} = +39°$ (methylene chloride, c.=1.09)

IR:
　　$\lambda_{max}^{KBr} = 2.88$ (OH)/4.83 u. 5.05 (—NCS) wide, very strong, conical bands/5.82 (3-ketone)/

UV:
　　$\epsilon_{247}^{MeOH} = 1290$
　　$\epsilon_{207}^{MeOH} = 2290$

No trace of unconverted $\Delta^4$-3-ketone was found in the UV- and IR-spectra.

EXAMPLE 9

*5-isothiocyano-19-nor-17α-ethinyl-androstane-(or testane)-17β-ol-3-one*

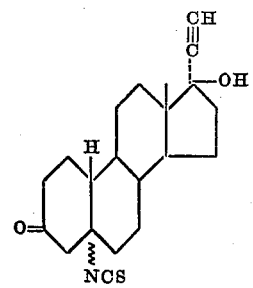

5.0 g. of 19-nor-17α-ethinyl-testosterone were treated with 8% thiocyanic acid as in Examples 7 and 8. From 6.6 g. of crude product there were obtained by recrystallization from acetone-hexane 5.0 g. of pure 5-isothiocyano-19-nor-steroid, m. pt. 155–157° C. (decomp.)

Analysis—$C_{21}H_{27}O_2NS$:
　　Calculated—
　　　　C=70.55%
　　　　H=7.61%
　　　　N=3.92%
　　　　S=8.97%

Found—
 C=70.6%
 H=7.9%
 N=3.9%
 S=9.0%

$[\alpha]_D^{22} = +46°$ (methylene chloride, c.=1.02)

IR:
 $\lambda_{max}^{KBr} = 3.01$ (OH)/3.13 (—C≡CH)/4.87 (—NCS) wide, very strong, conical bands/5.89–5.91 (3-ketone)/

UV:
 $\epsilon_{247}^{MeOH} = 1240$
 $\epsilon_{207}^{MeOH} = 1940$

No trace of unconverted $\Delta^4$-3-ketone was detectable in the UV- or IR-spectrum.

EXAMPLE 10

*5-isothiocyano-19-nor-17α-ethinyl-androstane-(or testane)-17β-ol-3-one-17-acetate*

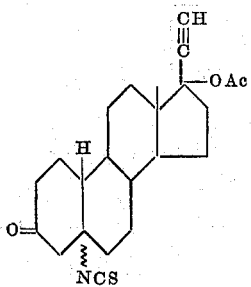

5.0 g. of 17α-ethinyl-19-nor-testosterone acetate were dissolved in 250 ml. of chloroform and shaken under nitrogen with a solution of thiocyanic acid (made from 130 ml. of 60% ammonium thiocyanate solution and 70 ml. 73% sulfuric acid) for 6 hours. After working up according to the general procedure there were obtained 6.0 g. of crude product which was recrystallized from isopropyl ether with addition of a little acetone to yield 4.9 g. of pure 5-isothiocyano-19-nor-17α-ethinyl-androstane-(or testane)-17β-ol-3-one-17-acetate of m. pt. 141–143° C. (decomp.).

Analysis—$C_{23}H_{29}O_3NS$:
 Calculated—
  C=69.05%
  H=7.29%
  N=3.50%
  S=8.02%
 Found—
  C=69.0%
  H=7.5%
  N=3.6%
  S=8.2%

$[\alpha]_D^{22} = +32°$ (methylene chloride, c.=1.00)

IR:
 $\lambda_{max}^{KBr} = 3.03$ (athinyl-)/4.80 u. 4.91 (—NCS)/5.03 (Schulter)/5.75 (C=O-acetate)/5.83 (20-ketone)/ 7.95, 8.03, 8.14 (acetate) u. 9.74 (acetate)/

UV:
 $\epsilon_{246}^{MeOH} = 1440$
 $\epsilon_{204}^{MeOH} = 7010$

It was no longer possible to detect $\Delta^4$-3-ketone.

EXAMPLE 11

*5-isothiocyano-19-nor-17α-ethinyl-androstane-(or testane)-17β-ol-3-one-17-oenanthate*

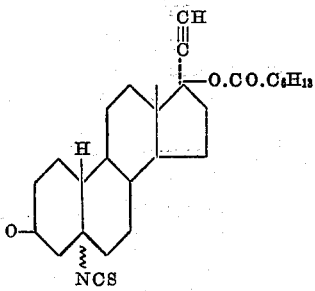

5.0 g. of 17α-ethinyl-19-nor-testosterone oenanthate are treated for 6 hours with thiocyanic acid as described in Example 10. From 5.4 g. of crude product there was obtained after recrystallization from isopropyl ether-acetone, 5.2 g. of pure 5-isothiocyano-19-nor-17α-ethinyl-androstane-(or testane)-17β-ol-3-one-17-oenanthate, m. pt. 125–126.5° C.

Analysis—$C_{28}H_{39}O_3NS$:
 Calculated—
  C=71.60%
  H=8.31%
  N=2.98%
  S=6.83%
 Found—
  C=71.8%
  H=8.3%
  N=2.7%
  S=6.4%

$[\alpha]_D^{22} = +34°$ (methylene chloride, c.=1.00)

IR:
 $\lambda_{max}^{KBr} = 3.05$ (athinyl-)/4.89 u. 5.03 (—NCS)/5.77 (C=O-ester)/5.83 (isol. 3-ketone) 9.76 (C=O), ester UV:
 $\epsilon_{246}^{M2OH} = 1490$
 $\epsilon_{205}^{MeOH} = 3550$ It was no longer possible to detect $\Delta^4$-3-ketone.

EXAMPLE 12

2.0 g. of 19-nor-17α-methyl-testosterone were dissolved in 100 ml. of acetone and treated with a thiocyanic acid solution prepared from 28.5 g. of ammonium thiocyanate in 20 ml. water and 9.5 ml. 96% sulfuric acid in 20 ml. water. The mixture is allowed to stand 4 hours at room temperature, diluted with 2 liters water and extracted after neutralization, with ethyl acetate. The extracts are washed neutral and thiocyanate-free, dried over sodium sulfate and concentrated in vacuo. From 2.6 g. of crude product there are obtained after recrystallization from acetone-hexane, 2.1 g. of practically pure 5-isothiocyano-19-nor-17α-methyl-androstane-(or testane)-17β-ol-3-one, m. pt. 117–118° C. (decomp.).

The physical data are in agreement with those of Example 8.

The isothiocyano-steroids obtainable in accordance with this invention, particularly those having the isothiocyano group in positions 1, 5, 9, and 16, are pharmacologically active, as indicated previously. Thus, for example, the 5-isothiocyano-androstane-17β-ol-3-one acetate of Example 1 on subcutaneous application in the anabolic test shows twice as strong an action as testosterone acetate, while the androgenic activity of the compound is only slightly increased:

Example 1 compound:
 12.1000γ—
  695 mg. seminal vesicle
  545 mg. prostate
  75 mg. levator ani Testosterone acetate:
  12.1000γ—
    642 mg. seminal vesicle
    415 mg. prostate
    37 mg. levator ani Similar relationships are shown in the case of the 5-isothiocyano-17α-methylandrostane-17β-ol-3-one compound of Example 2, compared to 17-methyltestosterone:

Example 2 compound:
  12.1000γ—470 mg. seminal vesicle
  12.100γ—159 mg. do.
  12.1000γ—434 mg. prostate
  12.100γ—154 mg. do.
  12.1000γ—89 mg. levator ani
  12.100γ—52 mg. do.

Methyltestosterone:
  12.1000γ—320 mg. seminal vesicle
  12.100γ—110 mg. do.
  12.1000γ—250 mg. prostate
  12.100γ—100 mg. do.
  12.1000γ—45 mg. levator ani
  12.100γ—35 mg. do.

The isothiocyanosteroids of this invention are also particularly valuable as starting products for the preparation of methylaminasteroids, which may be prepared, for example, by reduction of the isothiocyano group with lithium aluminum hydride or sodium borohydride. Moreover, the isothiocyano steroids, through conversion with primary or secondary amines, can be transformed into substituted steroid-thioureas, which exhibit good analeptic action.

The term mild conditions as used in this specification refers to the fact that the reaction can be carried out advantageously at room temperature. Moreover, by working in a two-phase system, the acid-sensitive steroid is always kept separated from the acid, which occurs in the methylene chloride phase, for example, only in very small concentrations. The reaction thus takes place only at the phase boundaries.

In accordance with the present invention, the concentration of thiocyanic acid may vary from about 8 to 25 percent. By using weak thiocyanic acid, it is advantageous to improve the speed of the reaction by the addition of small amounts of sulfuric acid.

As organic solvents for the two phase system there may be used, in addition to methylene chloride, such other products as chloroform, ethylene chloride, or benzene.

We claim:

1. Method for the preparation of isothiocyanosteroids in which the isothiocyano group is in the β-position relative to a keto group which comprises reacting α,β-unsaturated keto-steroids selected from the group consisting of the androstane series and the pregnane series with concentrated aqueous solutions of thiocyanic acid.

2. Method for the preparation of isothiocyanosteroids in which the isothiocyano group is in the β-position relative to a keto group which comprises reacting α,β-unsaturated keto-steroids selected from the group consisting of the androstane series and the pregnane series in solution in a water-immiscible inert organic solvent in a two phase system with a concentrated aqueous solution of thiocyanic acid.

3. The method of claim 2 in which the organic solvent is methylene chloride.

4. Isothiocyano-steroids selected from the group consisting of members of the androstane series and the pregnane series in which the isothiocyano group is in the β-position relative to a keto group.

5. The method which comprises reacting a $\Delta^4$-3-ketosteroid selected from the group consisting of the androstane series and the pregnane series with a concentrated aqueous solution of thiocyanic acid.

6. The method which comprises reacting a $\Delta^1$-3-ketosteroid selected from the group consisting of the androstane series and the pregnane series with a concentrated aqueous solution of thiocyanic acid.

7. The method which compromises reacting a $\Delta^{9,11}$-12-keto-steroid selected from the group consisting of the androstane series and the pregnane series with a concentrated aqueous solution of thiocyanic acid.

8. The method which comprises reacting a $\Delta^{16}$-20-keto-steroid selected from the group consisting of the androstane series and the pregnane series with a concentrated aqueous solution of thiocyanic acid.

9. 5-isothiocyano-androstane-17β-ol-3-one acetate.

10. 5 - isothiocyano - 17α - methyl-androstane-17β-ol-3-one.

11. 5-isothiocyano-androstane-11β-ol-3,17-dione.

12. 16β-isothiocyano-$\Delta^5$-pregnane-3β-ol-20-one acetate.

13. 5,16β-di-isothiocyanopregnane-3,20-dione.

14. 5-isothiocyano - pregnane - 17α - ol-3,20-dione-17-caproate.

15. 1-ξ-isothiocyano-androstane-17β-ol-3-one.

16. 5 - isothiocyano-19-nor-17α-methylandrostane-17β-ol-3-one.

17. 5 - isothiocyano - 19 - nor-17α-ethinyl-androstane-17β-ol-3-one.

18. 5-isothiocyano-19 - nor - 17α - ethinyl-androstane-17β-ol-3-one-17-acetate.

19. 5 - isothiocyano - 19 - nor-17α-ethinyl-androstane-17β-ol-3-one-17-oenanthate.

No references cited.